Nov. 2, 1926.  
H. C. BOLL  
1,605,643  
SAFETY VALVE FOR PNEUMATIC TIRES  
Filed March 6, 1925

INVENTOR:-  
HENRY C. BOLL  
By Edward E. Longan  
ATTORNEY.

Patented Nov. 2, 1926.

1,605,643

UNITED STATES PATENT OFFICE.

HENRY C. BOLL, OF NORTH LITTLE ROCK, ARKANSAS.

SAFETY VALVE FOR PNEUMATIC TIRES.

Application filed March 6, 1925. Serial No. 13,434.

My invention relates to improvements in safety valves for pneumatic tires, and has for its preliminary object a safety valve which will release excess pressure from a pneumatic tire and prevent blowouts, it being a well-known fact that the pressure in pneumatic tires rises considerably when the tire is rolled over a pavement, and it is to prevent this excessive pressure and consequent danger of blow-outs, while the vehicle is traveling, that my device is designed.

A further object is to construct a safety valve for pneumatic tires which can be set for any predetermined pressure so that in the event too much air is introduced into the tire that same will escape. In other words, when my device has been once set, it will be impossible to over-inflate a tire.

In the drawings:—

Figure 1:
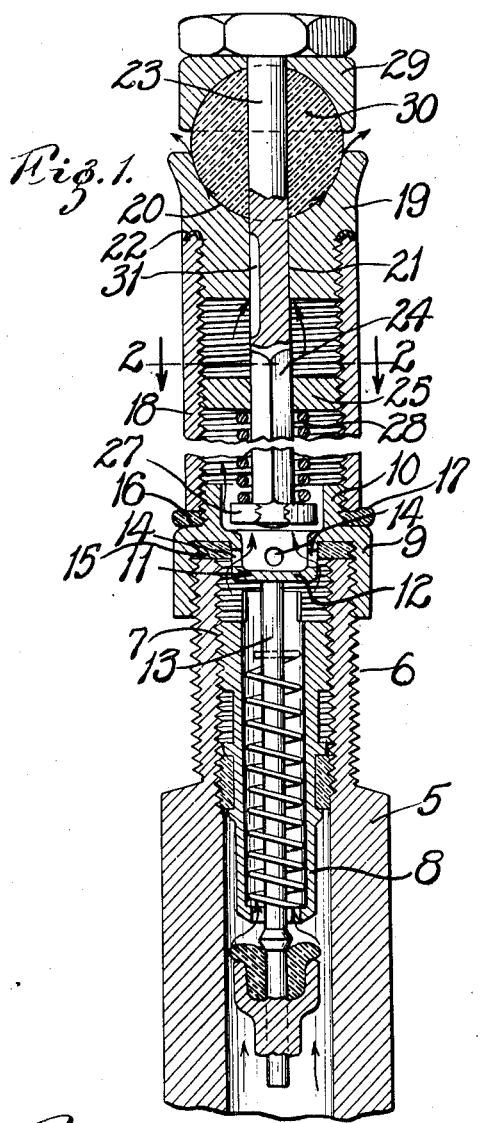
Fig. 1 is a vertical section of my device showing the same applied to the upper part of a valve stem.

In the construction of my device I employ a valve stem 5, which is of ordinary construction and which has its upper end provided with external screw threads 6 and internal screw threads 7. Within the valve stem 5 is located the ordinary valve inside 8. Secured to the valve stem by means of the screw threads 6 is a cap 9, which is provided with an upwardly extending screw threaded portion 10. Intermediate the ends of the cap 9 is a web 11, which is provided with a central depression 12, which is designed to contact with the stem 13 of the valve inside 8; the purpose of which will be explained in detail later. The depression 12 is provided with openings 14 so that air from the tire can pass therethrough. A gasket 15 rests against the web to assist in making an air-tight joint. It will be noted from the drawings that the screw threaded portion 10 is of smaller diameter so as to form a shoulder 16 on which a gasket 17 is placed. Secured to the screw threaded portion 10 of the cap 9 is a sleeve 18, which is preferably screw threaded throughout its entire interior. Secured to the upper end of the sleeve 18 is a cap 19, which is provided with a spherical depression 20 and with a central bore 21. A gasket 22 is employed to assist in making a leak-tight joint between the cap 19 and the sleeve 18; extending through the bore 21 is a stem 23, the lower end of which is made square as at 24. Fitting over the square portion 24 of the stem 23 is a nut 25, which is externally screw threaded and which is adapted to engage with the screw threads formed in the sleeve 18. The nut 25 fits the square portion loosely so as to permit an air passage, and to facilitate this air passage I may provide notches 26. Secured to the lower end of the squared portion 24 is a disk or nut 27 and between the nuts 25 and 27 is inserted a coil spring 28, the purpose of which will be explained in detail later. Formed integral with the upper end of the stem 23 is a cup-shaped member 29, its upper end being preferably hexagonal so as to permit turning of the stem. Surrounding the stem and located in the cup-shaped member 29 is a ball 30, which is preferably formed of rubber or similar resilient material. The stem 23 is also provided with a longitudinally extending notch 31, which will permit the ready escape of air when the ball or valve 30 has been raised a predetermined distance out of the spherical recess or cup 20.

It is to be understood, of course, that the bore 21 through the cap 19 is slightly larger than the diameter of the stem 23 so that as soon as the valve 30 is unseated, air can bleed along the stem 23 and escape slowly.

Figure 3:
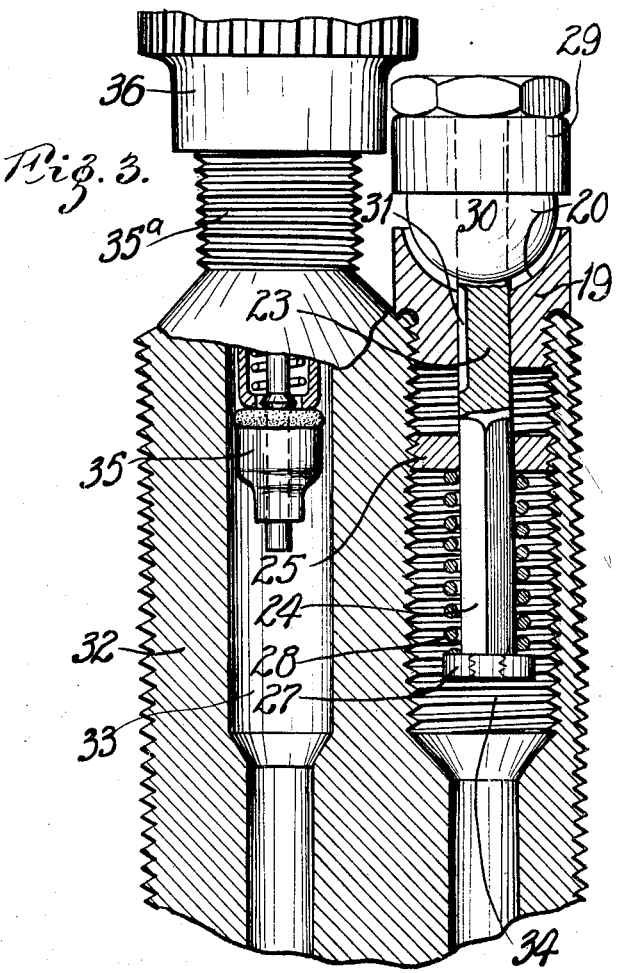
Fig. 3 is an enlarged vertical section of the upper portion of a valve stem with my device incorporated therein.
Figure 2:
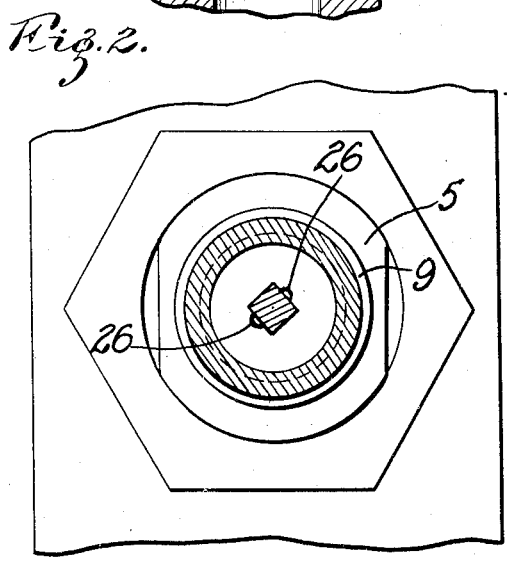
Fig. 2 is a horizontal section taken on the line 2—2 of Fig. 1.
Figure 4:
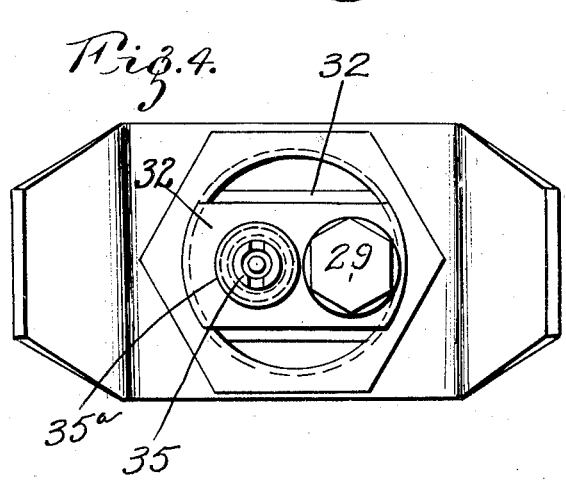
Fig. 4 is a top plan view on a reduced scale of the valve stem shown in Fig. 3.

In Fig. 3 I have shown a modified form in which the safety valve is incorporated directly in the valve stem. In this instance the valve stem 32 is provided with bores 33 and 34, which extend entirely through the stem. In the bore 33 is seated the usual valve inside 35. The valve stem is also provided with an externally screw threaded projection by means of which a valve cap 36 can be applied. The bore 34 is internally screw threaded so as to receive the safety valve. With this construction it will be impossible to inflate a tire beyond the pressure permitted by the safety valve as all excess pressure will unseat the valve and permit the air to escape, thus permitting at all times over-inflation.

In applying the device as shown in Fig. 1, the tire is first inflated in the ordinary manner and as soon as the air hose is removed the valve inside will seat. The safety valve is then screwed on over the screw thread 6 and the central depression 12 of the cap 9 will unseat the valve inside. This will permit air from the tire to pass through the openings 14 and into the sleeve 18, and then up along the stem 23 until it is stopped by the valve 30.

Should any rise in pressure occur within the tire due to the rise of temperature of the air, while the vehicle is moving, this excess pressure will lift the valve 30 and permit the air to escape until the desired pressure is reached, when the valve will again seat itself. The pressure at which the valve 30 unseats is regulated by turning the cap 29, which will cause the nut 25 to move up and down within the screw threaded sleeve 18, thus increasing or decreasing the tension on the spring 28. In this manner the unseating of the valve 30 can be accurately regulated. It is, of course, possible that during the running of a vehicle, even should no rise in pressure take place, that a small percentage of air will escape when sudden jolts, such as hitting rocks and the like, are encountered, as this will naturally cause a momentary increase in pressure of the tire, but the amount of air thus escaping is so slight as to be negligible; the loss thus being about the same as ordinarily will leak out through the ordinary valve. With the structure shown in Fig. 3, as previously described, it will be impossible to inflate a tire beyond its predetermined capacity or beyond the setting of the valve, because further influx of pressure will unseat the safety valve and permit the air to escape. This will warn the person inflating the tire that he has sufficient air therein and eliminates entirely the need of a pressure gauge.

My device can be either installed as shown in Fig. 1 to the present type of valve stem or, if desired, can be built directly in the stem, and when built in the stem, its dimension is changed in one direction only, so that the only changes necessary in the rim and wheel will be to elongate the valve stem opening as the width of the stem will not be changed.

Having fully described my invention, what I claim is:—

1. A safety valve for pneumatic tires comprising an internally screw threaded member, a cap provided with a depression carried by said member, a valve stem having a longitudinal groove extending through said cap, a nut located in said internally screw threaded member and rotatably carried by and slidably mounted on said valve stem, means for rotating said valve stem, a resilient member carried by said stem and normally seated in said depression for sealing said valve, and means for normally holding said resilient member in seated position.

2. A safety valve for pneumatic tires comprising an internally screw threaded sleeve, a cap provided with a depression carried by one end of said sleeve, a valve stem having a longitudinal groove extending through said cap, a nut provided with air passages and externally screw threaded located in said sleeve and rotatably carried by, and slidably mounted on said valve stem, a resilient member carried by said stem and located in said depression for sealing said valve, and means for normally holding said resilient member in seated position.

3. A safety valve for pneumatic tires comprising an internally screw threaded sleeve, a valve stem having a cylindrical upper portion and a square lower portion located in said sleeve and projecting beyond one end thereof, an externally screw threaded disk provided with air passages slidably mounted on said square portion, a second disk secured to the end of the square portion of said valve stem, a coil spring interposed between said disks and adapted to have its tension regulated by the up and down movement of the said screw threaded disk, a cap provided with a depression carried by the upper end of said sleeve and surrounding the valve stem, a resilient member carried by said valve stem and adapted to be held seated in said depression by said spring, and means for turning said valve stem for moving said screw threaded disk up and down in the sleeve whereby the tension of the spring is regulated and the pressure required to unseat the resilient member controlled.

In testimony whereof, I have signed my name to this specification.

HENRY C. BOLL.